Jan. 21, 1964 W. J. EASTMAN 3,118,327
TRANSFER MECHANISMS
Filed March 29, 1962 8 Sheets-Sheet 1
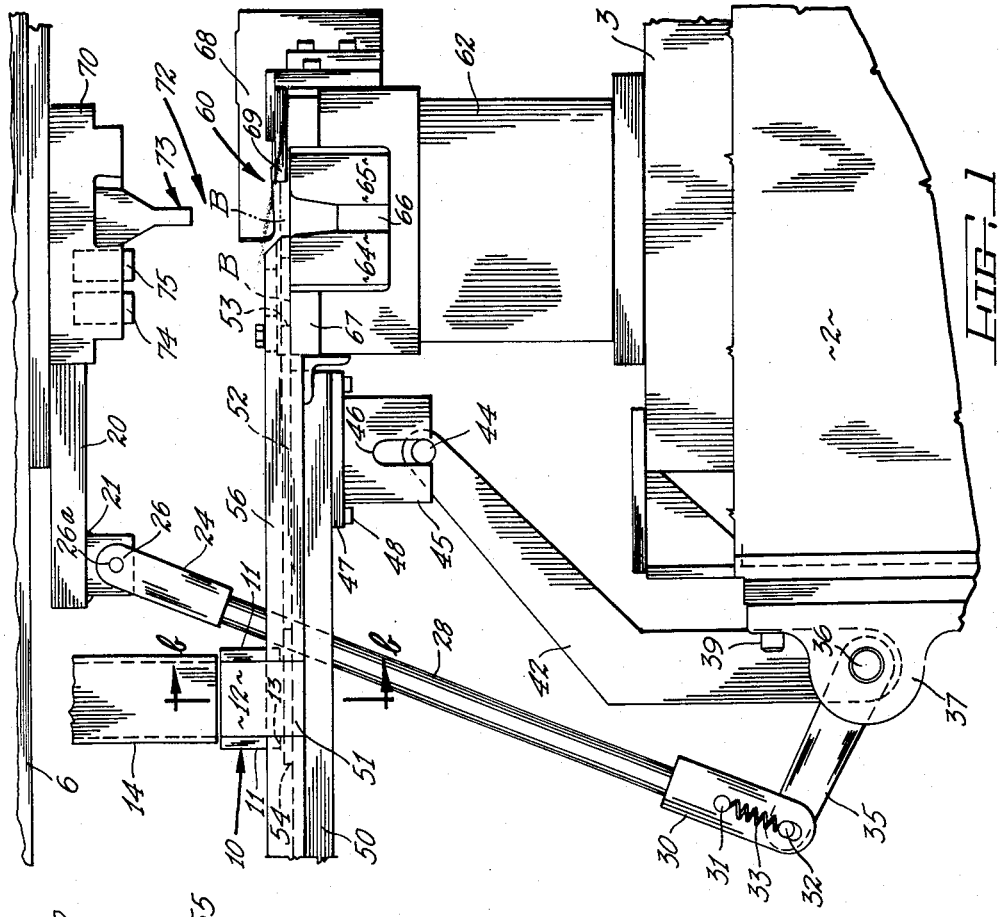
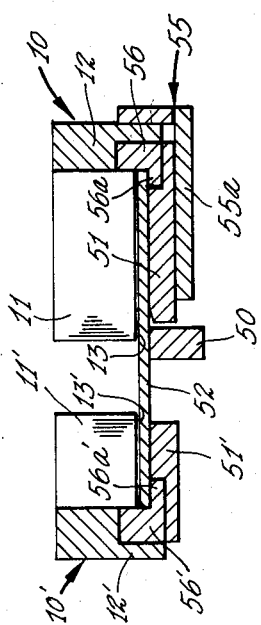
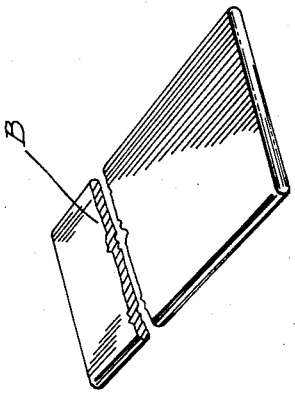
INVENTOR.
Wesley J. Eastman
BY
ATTORNEY Jan. 21, 1964

W. J. EASTMAN 3,118,327

TRANSFER MECHANISMS

Filed March 29, 1962

INVENTOR.
Wesley J. Eastman
BY
ATTORNEY

Jan. 21, 1964 W. J. EASTMAN 3,118,327
TRANSFER MECHANISMS
Filed March 29, 1962 8 Sheets-Sheet 3
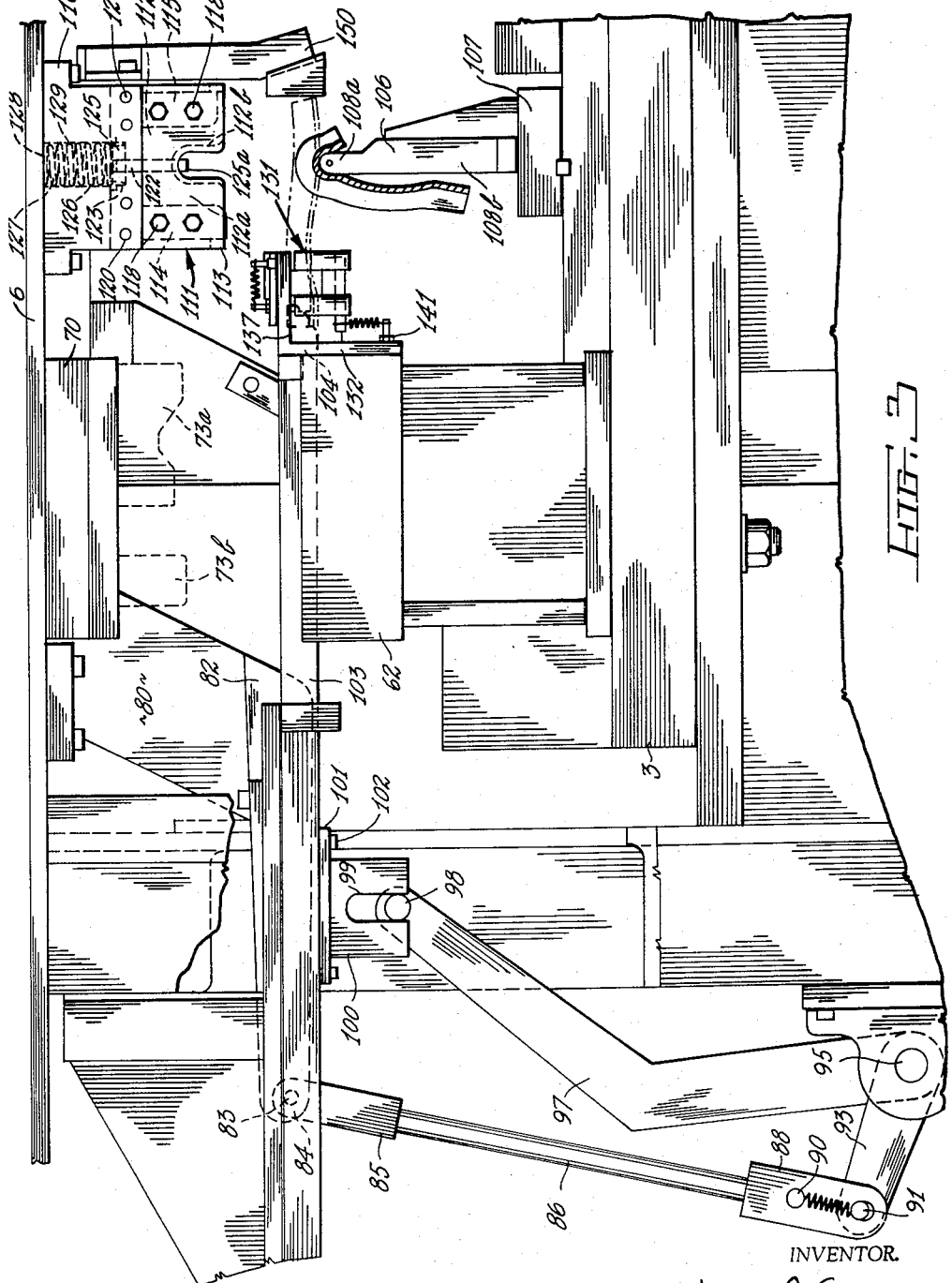
INVENTOR.
Wesley J. Eastman
BY
ATTORNEY Jan. 21, 1964
W. J. EASTMAN
3,118,327
TRANSFER MECHANISMS
Filed March 29, 1962
8 Sheets-Sheet 5
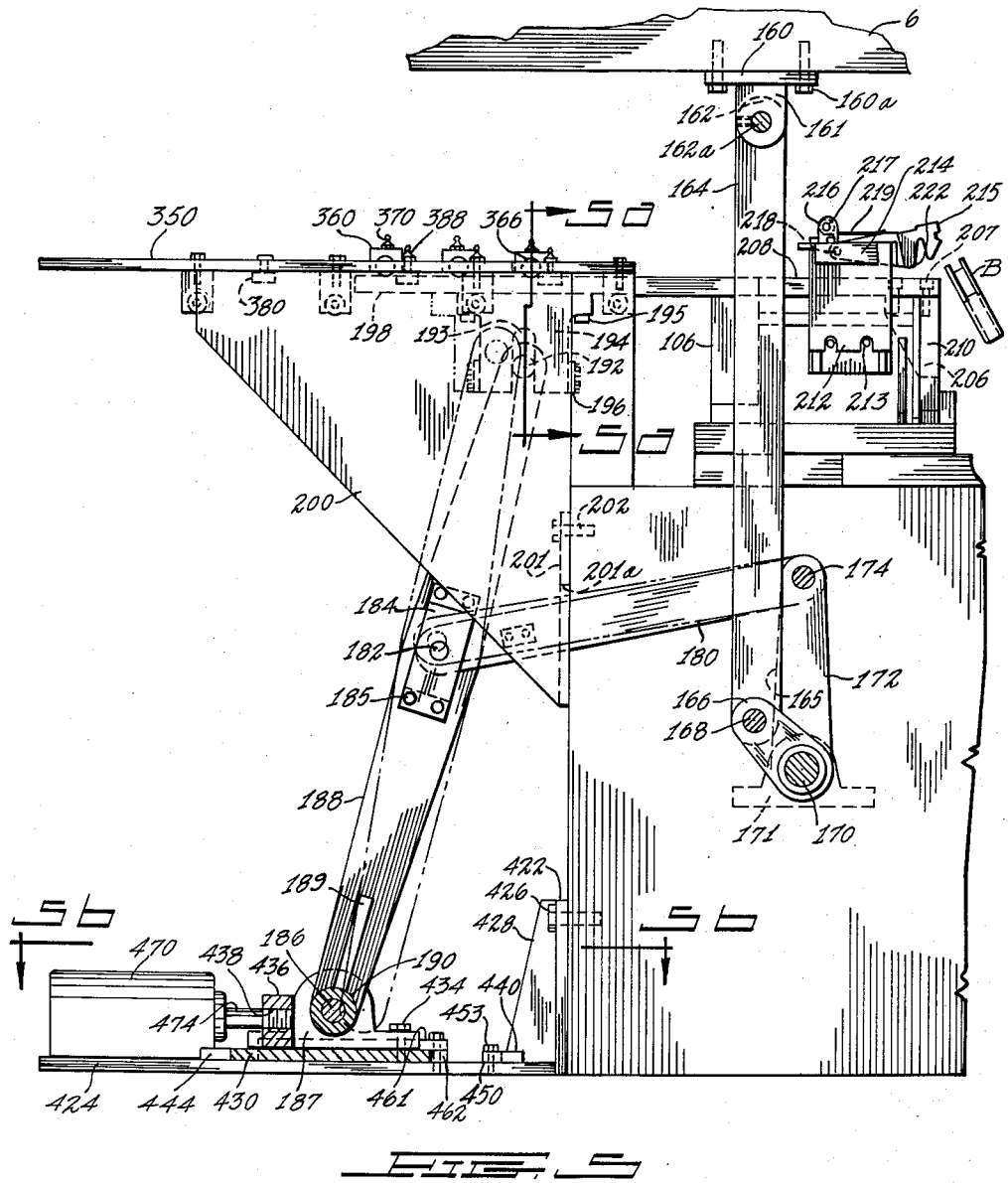
INVENTOR.
Wesley J. Eastman
BY
Attorney Jan. 21, 1964 W. J. EASTMAN 3,118,327
TRANSFER MECHANISMS
Filed March 29, 1962 8 Sheets-Sheet 6
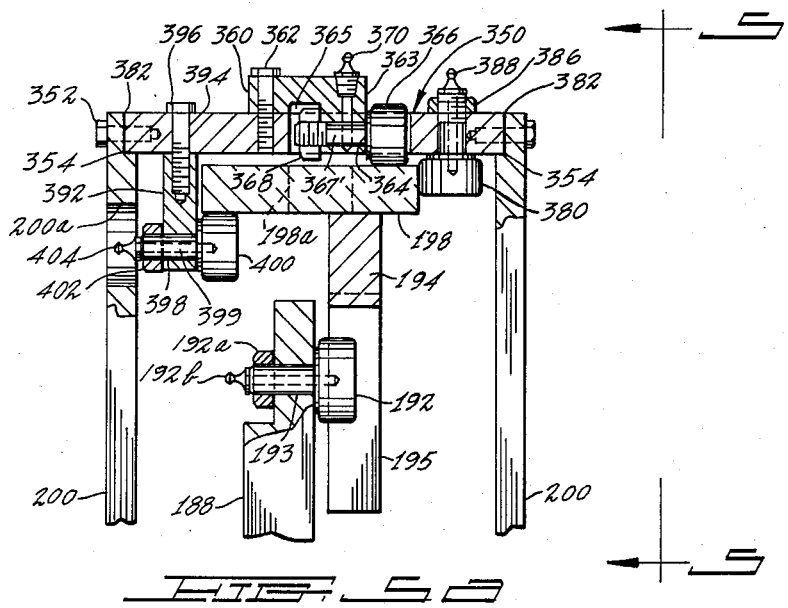
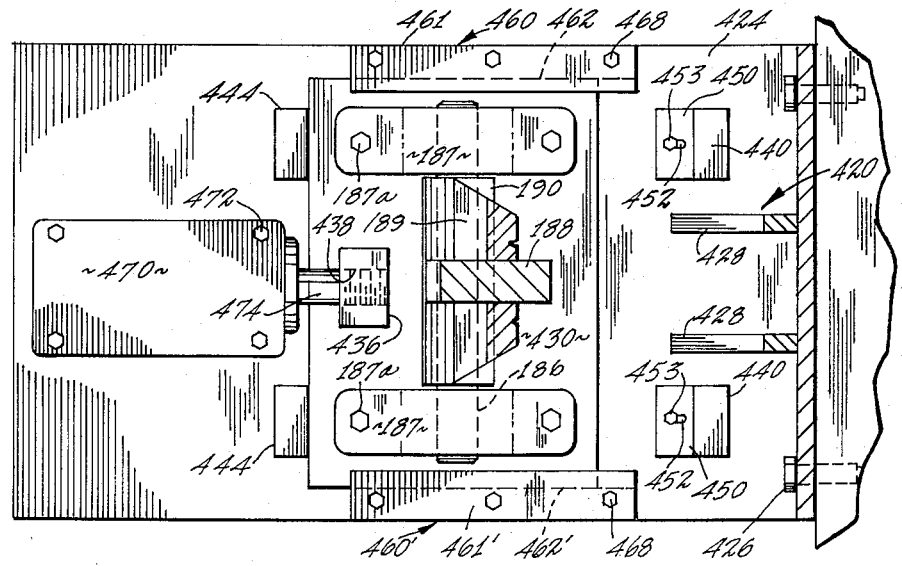
INVENTOR.
Wesley J. Eastman
BY
Attorney Jan. 21, 1964 W. J. EASTMAN 3,118,327
TRANSFER MECHANISMS
Filed March 29, 1962 8 Sheets-Sheet 7

INVENTOR.
Wesley J. Eastman
BY
ATTORNEY

Jan. 21, 1964 W. J. EASTMAN 3,118,327
TRANSFER MECHANISMS
Filed March 29, 1962 8 Sheets-Sheet 8

INVENTOR.
Wesley J. Eastman
BY
ATTORNEY

United States Patent Office 3,118,327
Patented Jan. 21, 1964

3,118,327
TRANSFER MECHANISMS
Wesley J. Eastman, Ashtabula, Ohio, assignor to True Temper Corporation, Cleveland, Ohio, a corporation of Ohio
Filed Mar. 29, 1962, Ser. No. 183,590
7 Claims. (Cl. 78—99)

This invention relates to an improvement in apparatus for manufacturing rail anchors, the apparatus being of the type described in copending U.S. application, S.N. 136,381, filed August 10, 1961. More specifically, this invention relates to improved rail anchor blank transfer means for transferring the blanks between successive, spaced work stations.

In the rail anchor forming apparatus described and claimed in the application referred to above, a continuous die-forging operation was described wherein the forming process performed at a plurality, three being illustrated, of successive forming stations was completely automatic. As more clearly explained in the above application, the rail anchor blank being transferred by transfer means therein described from the second to the third forming station was the sole means for ejecting the finally formed rail anchor from the final forming horn. More specifically, the rail anchor blank, when transferred from the second to the third or final forming horn and when positioned over the said final forming horn, contacted the finally formed rail anchor positioned on said final forming horn thereby ejecting said completed rail anchor from the final form horn for subsequent removal from the apparatus.

This method of ejecting the finally formed anchor was and remains highly satisfactory. However, at the cessation of operation of the apparatus there remains on the final forming horn a partially formed rail anchor, having been transferred there during the last transferring movement before cessation of operations. These partially formed rail anchors must be removed before the rail forming operation is again started since the time interval between operations normally is of such a duration that the temperature of the rail anchor blank decreases to a point below that required for forming the rail anchor blank, thereby precluding further forming thereof. Since the stoppages, however, brief, during normal operations can be relatively frequent, for one reason or another, the wastage in the ofrm of partially completed rail anchors can be considerable.

With the above situation in mind, it is a primary object of my invention to prevent wastage in the form of partially formed rail anchors by providing a transfer means which is adjustable and, when selectively actuated for the purpose of removing the finally formed rail anchor still positioned over said final form horn will eject the same therefrom.

It is a further object of my invention to provide an adjustably mounted transfer means that is automatically operated upon actuation of a source of energization conveniently positioned on the apparatus.

Yet another object of my invention is to provide an improved transfer means that substantially reduces friction during reciprocal movement thereof.

These and other objects of the invention will become more apparent from the following specification and drawings in which:

FIG. 1 is a side elevational view of a magazine and transfer mechanism for transferring rail anchor blanks from a magazine mounted adjacent said transfer mechanism and receiving said blanks from a dispensing station to a first forming station;

FIG. 1a is a perspective view of the preferred blank fed to the magazine;

FIG. 1b is a sectional view taken on line 1b—1b of FIG. 1 and shows the transfer mechanism for transferring the rail anchor blanks to the first forming station;

FIG. 3 is a front elevational view showing the first forming station, the second forming station, and transfer mechanism for transferring the rail anchor blank from the first forming station to the second forming station;

FIG. 5 is a side elevational view showing the second station forming horn, a third or final station forming horn, and the improved transfer mechanism for transferring the partially completed rail anchor from the second forming horn station to the third or final forming horn station;

FIG. 5a is a vertical sectional view taken on line 5a—5a of FIG. 5 and shows, in enlarged form, the guide means for the transfer mechanism;

FIG. 5b is a horizontal sectional view taken on line 5b—5b of FIG. 5 and shows, in enlarged form, the structure for adjustably mounting the transfer mechanism for transferring the rail anchor blank from the second to the third forming station;

Figure 7A:
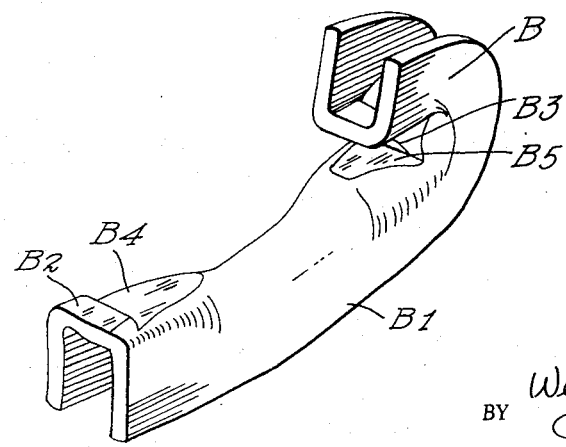
FIG. 7a is a perspective view of the complete rail anchor subsequent to the forming thereof on the final form horn.

In general the rail anchor, shown in completed form in FIG. 7a, is formed in the following manner; flat steel blanks of very high temperature, e.g. 1850° F., are fed to magazines; the blanks are subsequently conveyed, one at a time, to a stamping station and subsequently to a first forming station where the blank is formed into a generally channel shape anchor having certain portions arcuately formed; the blank is then conveyed from the said first channel forming station to a second station and disposed upon a forming horn, at the said second station, the generally channel-shaped rail anchor being there formed into a substantially J-shaped channel; the substantially J-shaped anchor form is then conveyed to a third or final station and onto a second forming horn by conveyor mechanism; at said final station, the J-shaped anchor form achieves its final shape having bearing pads, an anchor hook, overdrive preventing means, etc. formed therein; the completed rail anchor is normally removed from the final horn by a succeeding J-shaped rail anchor form, the completed rail anchor being caused by the movement of said succeeding anchor form to drop into a discharge chute for subsequent handling. However, in accordance with the instant invention, the finally formed rail anchor can be ejected from the final horn by means of the transfer mechanism associated therewith, as will be more specifically explained hereinbelow.

Referring now to the drawings, in which all like parts are designated by like reference characters and referring more particularly to FIGS. 1 and 1b, wherein the structure for feeding the heated blanks to the apparatus and for transferring the blanks to the first forming station is illustrated, at 10 a fixed magazine is shown, which combines with an adjustable magazine 10', FIG. 1b, to receive heated blanks and to dispense the same. Each of said magazines in the form shown herein comprises a pair of side walls 11, 11' and end walls 12, 12', respectively, the sidewalls 11, 11' having bottom portions 13, 13' which terminate appreciably above the bottom of the end walls 12 and 12', the said magazines being disposed above a slideway or transfer mechanism leading to a stamping station and a first forming station. The blanks fed to the magazine 10 through a downwardly inclined chute 14 which is preferably rectangularly shaped, as shown in FIG. 1a, and the blanks are fed thereto at extremely high temperatures, as indicated above. Prior to the feeding of the said blanks into the fixed magazine 10 they are heated to the desired temperature, approximately 1850° F., by any suitable furnace or other heating means (not shown). Although it will be apparent that the invention is capable of being modified ot accommodate blanks of varying sizes and forms, the blank illustrated in FIG. 1a is approximately ¼ to ⅜ inch in thickness, 3 inches wide, and 10½ inches long.

Referring now to the manner in which the heated rail anchor blanks are conveyed or transferred from the magazines 10 and 10' to the first forming station 72, the actuating mechanism for said transfer mechanism includes a ram bearing bar 20 integrally secured to a reciprocating ram 6 mounted in the upper portion of a die press, which, in a conventional manner, reciprocates to perform the desired die forming operations. The ram 6 further functions to actuate various transfer devices, as will be more particularly related hereinafter. The bar 20 is adapted to be reciprocated by the ram 6 and actuates by means of a plurality of levers 28, 35 and 42 and a pusher bar 50 which is integrally secured to a longitudinally extending pusher plate 52.

Referring to FIG. 1b, pusher plate 52 is adapted to be reciprocated in a slideway formed by a pair of L-shaped guide member 56, 56', which cooperate with the magazine to form a slideway on which successive anchors are deposited and in which the pusher plate moves to advance said successively deposited anchors. The guide members are preferably two in number, one member 56 being fixed and one member designated at 56' being movable to permit adjustment thereof wherefor various size rail anchors may be processed. Guide members 56 and 56' are generally L-shaped, positioned on either side of the pusher plate 52 and beneath the same, and are seated in openings in the end walls 12, 12', respectively, of the fixed magazine 10 and adjustable magazines 10'. The inturned end portions 56a and 56a' of the guide members 56 and 56', respectively, support the said pusher plate 52 and support the blank being transferred thereby to the first forming station. The guide members 56 and 56' are mounted on the frame of the press by mounting member (not shown), guide member 56 being fixedly mounted and guide member 57 being mounted for adjustment.

Support members 51 and 51' are secured to the bottom portions of the guide members 56 and 56' by bolt means (not shown). The support members 51 and 51' are approximately the same width as the magazines 10 and 10' and function to provide additional support for the rail anchor blanks positioned in the magazines, and further function to prevent the blanks from falling through the opening between the guide members. Support member 51 is fixed and forms part of the fixed magazine assembly and support 51', together with guide bar 56' and magazine 10', is adjustable to accommodate different size rail anchor blanks.

An L-shaped fixed magazine bottom support member 55 is secured to the back of the end wall 12 of the fixed magazine 10 by bolt means (not shown). The inturned end portion 55a of member 55 extends beneath the fixed support member 51 and supports the same in a fixed position.

Referring now to the manner in which the pusher plate 52 is reciprocated, the lever 28 is pivotally secured to the bar 20 through a U-shaped member 21 depending therefrom, a clevis 24 being adapted to be pivotably mounted thereon by means of pin means 26 which extend through aligned apertures 26a in said U-shaped member 21. The elongated angularly disposed actuating rod 28 is connected at its upper end to the clevis 24 and at its lower end to a magazine transfer actuating arm 42 by a clevis 30 and link 35, said clevis having a plurality of openings therethrough, into which pins 31 and 32 are projected. The pin 32 is disposed in an elongated opening in the clevis to provide a lost motion connection therewith, as will be described hereinbelow. A coil spring 33 is secured at its ends to the pins 31 and 32. The short arm or link 35 operatively connects the clevis 30 to arm 42 by pin means 32 and shaft means 36, and said shaft 36 is housed in a pillow block 37, on which the magazine transfer bar actuating arm 42 is pivotally mounted. The upper end of the arm 42 is provided with a cam follower 44 which rides in an open-ended arcuate slot 46 centrally positioned in a cam follower yoke 45 secured to the bottom surface of a magazine pusher bar 50.

It will thus be seen that when ram 6 is moved downwardly by press apparatus (not shown) in timed sequence, the bar 20, clevis 24, actuating rod 28, and clevis 30 will likewise move downwardly causing the relatively short transverse arm 35 to rotate downwardly, pivoting in the pillow block 37. The arms 35 and 42 are preferably integrally secured to the shaft 36 as by welding or the like. Hence, as the arm 35 moves downwardly, the shaft 36 will rotate counterclockwise, to correspondingly move the actuating arm 42 counterclockwise, or to the left, as shown in FIG. 1. Thus it will be seen that cam follower yoke 45 will likewise be moved to the left, as viewed in FIG. 1, by the cam follower 44, and since the magazine pusher bar 50 is preferably connected to the cam follower yoke 45 by means of bolts 48, which extend through openings in a flange 47 of the cam follower yoke 45, the pusher plate 52 having a front end portion 53 and a rear end portion 54 and of sufficient width to engage a major portion of the length of the blank "B," the plate moves rearwardly to the left, as viewed in FIG. 1, and assumes a position where the end 53 is disposed outwardly of the magazine to initiate a blank moving sequence.

Upon upward movement of reciprocating ram 6, in a manner to be described hereinafter, the actuating lever 28 moves upwardly due to the above described connection with the reciprocating ram 6 and the ram 42 functions to move the cam follower yoke 45 forwardly or to the right, as viewed in FIG. 1, to the position as shown in dotted lines in FIG. 1 where the blank is deposited on a pair of aligned die part members 64 at a first forming station 72.

and immediately below stamping members 74, 75. The spring 33 and elongated slot in the clevis 30 provides a means to permit slight overtravel whereby stresses in the transfer mechanism are absorbed.

As noted above, the side walls 11, 11' of the magazines 10 and 15 have bottom portions 13, 13' which terminate above the bottom of the end wall 12 and the opening thus formed by the termination of side walls 11 and the positioning of the pusher plate 52 with respect thereto permits the plate 52 to freely move through said magazine, as illustrated in FIG. 1. Thus it will be seen that when the magazine pusher bar 50 is retracted in a manner explained above, the pusher plate 52 will likewise be retracted, assuming a position wherein the front end portion 53 of plate 52 is behind the magazines 10 and 10', permitting the lowermost blank in the magazines 10, 10' to drop to a position on the guide members 56, 56' and the support members 51 and 51' disposed immediately below the magazine whereby the said blank may be transferred by contact with the front end portion 53 of the plate 52 during the next succeeding transfer cycle.

It will be noted in FIG. 1 that the lowermost blank, subsequently transferred by the pusher plate 52, is not transferred immediately to a position immediately below the first form die punch 73 but rather it is preferred, as shown, that there be at all times a pair of blanks adjacent the first form, one blank being positioned immediately below the first form die punch, and the other blank being positioned in alignment with and immediately rearwardly of the first blank or to the left thereof, as viewed in FIG. 1. Thus, when a succeeding blank is transferred by the pusher plate 52, the previously rearwardly positioned blank will be transferred to a position immediately below the first form die punch 73 by contact of the succeeding blank, and rests upon die side members 64 and 65, the blank previously positioned thereunder having been transferred from the first form station to the succeeding form station.

Figure 2:
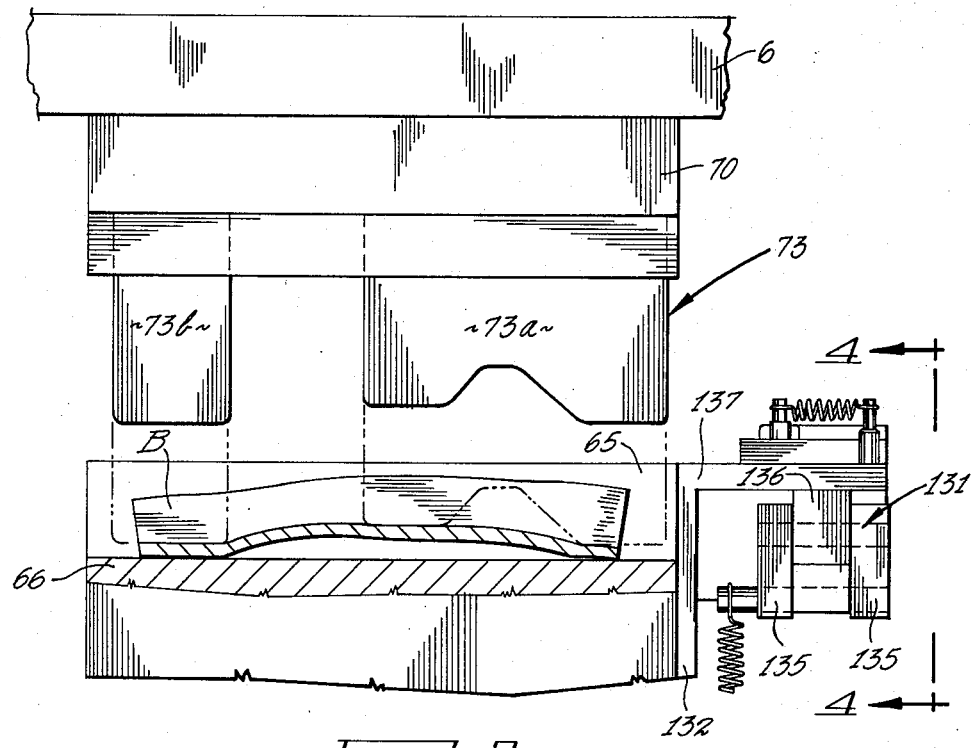
FIG. 2 is a front elevational view partly in section, showing the first forming station, with the blank being shown in solid lines in its formed shape, the forming dies being shown in elevated position, in solid lines and in blank forming position in dotted lines.

Referring now to FIGS. 1 and 2, the first forming station comprises a first form die punch holder 70, which is integrally secured to the reciprocating ram 6 and reciprocates therewith. The pair of stamping holders 74 and 75, referred to hereinbefore, are securely mounted in the punch holder 70, the holders 74 and 75 functioning to hold desired stampings or indicia (not shown). It is obvious that this is a desired but non-essential part of the rail anchor forming mechanism of this invention. The first form punch 73, as shown, is secured to the punch holder 70 which depends from and is secured to the ram means 6 and comprises a pair of aligned and spaced depending punch members 73a and 73b, the punch member 73b being generally rectangular in form having a generally flat bottom surface adapted to contact the hook end of the anchor and the punch 73a being of substantially greater length and having an irregular or notched central portion and a pair of spaced flat channel-forming surfaces.

As best illustrated in FIG. 1, a bottom die holder 62 is securely mounted on the base 2 and bolster plate 3 of the press whereby a bottom die is firmly held in place thereon. The bottom die comprises a stamping block die bottom 67, first form die side 64 and 65 and a first form die bottom 66. The die sides 64 and 65 combine with the die bottom 66 to define a generally U-shaped die opening for the reception of a rail anchor blank fed thereto and deformed therein by said first form punch 73 during the simultaneous downward movement of the punch members 73a and 73b thereof. A pattern stop member 69 is positioned above the rearwardly disposed die side 65 and serves to limit the movement of a blank positioned immediately below the first form punch 73 by the plate 52. A substantially L-shaped stripping member 68 is secured to the side of the die assembly and has its free end disposed over the bottom die at a position between the die punch members 73a and 73b whereby the same is adapted to function in a conventional manner to prevent the upward movement of the blank subsequent to the forming thereof at the first forming station.

Figure 2A:
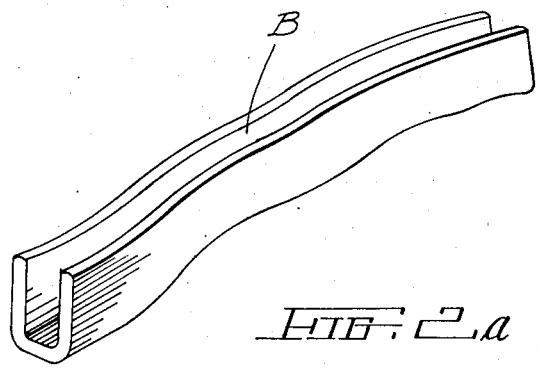
FIG. 2a is a perspective view of the rail anchor blank after the forming thereof at the first forming station shown in FIG. 2.

It will thus be seen that when the first form die punch 73 is moved downwardly, punches 73a and 73b will contact the upper portion of blank "B," thereby forming the blank "B" into a substantial channel type configuration, shown more clearly in FIG. 2a. Noting FIG. 2, the bottom surfaces of portions 73a and 73b of the first form punch 73 form a discontinuous line, whereby as the first form punch 73 moves downwardly into the dotted line position of FIG. 2, the blank B is generally bowed in the central portion thereof.

As punch holder 70 moves downwardly, it will be seen that stamping members secured to stamping holders 74 and 75 will function to stamp appropriate information on the blank succeeding the blank being formed by the first form die punch 73. Thus, during one cycle a blank B goes through the stamping operation, and in the next cycle the blank is formed into a channel-shaped bowed form anchor by the downward movement of punch 73.

When the first form punch 73 moves downwardly due to actuation of the reciprocating ram 6, the transfer pusher plate 52 is simultaneously moved rearwardly and upon upward movement of the first form punch 73 subsequent to the forming operation of a first blank, a succeeding blank is transferred from the magazine in a direction toward the first forming station and into a position below the stamping station and moves the blank previously positioned thereunder into a position immediately below the first form die punch 73.

It will be apparent to those skilled in the art that if the stamping operation be eliminated, appropriate changes could be made in the transfer mechanism to transfer the blank directly from the magazine to a position below the first form punch 73.

Figure 3A:
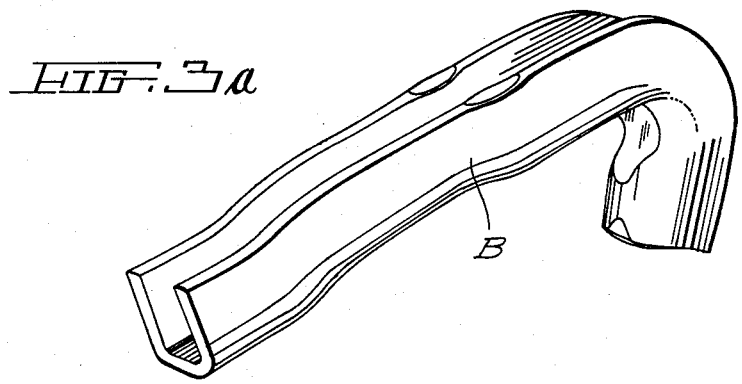
FIG. 3a is a perspective view of the rail anchor blank after the second forming operation at the second forming horn station.
Figure 4:
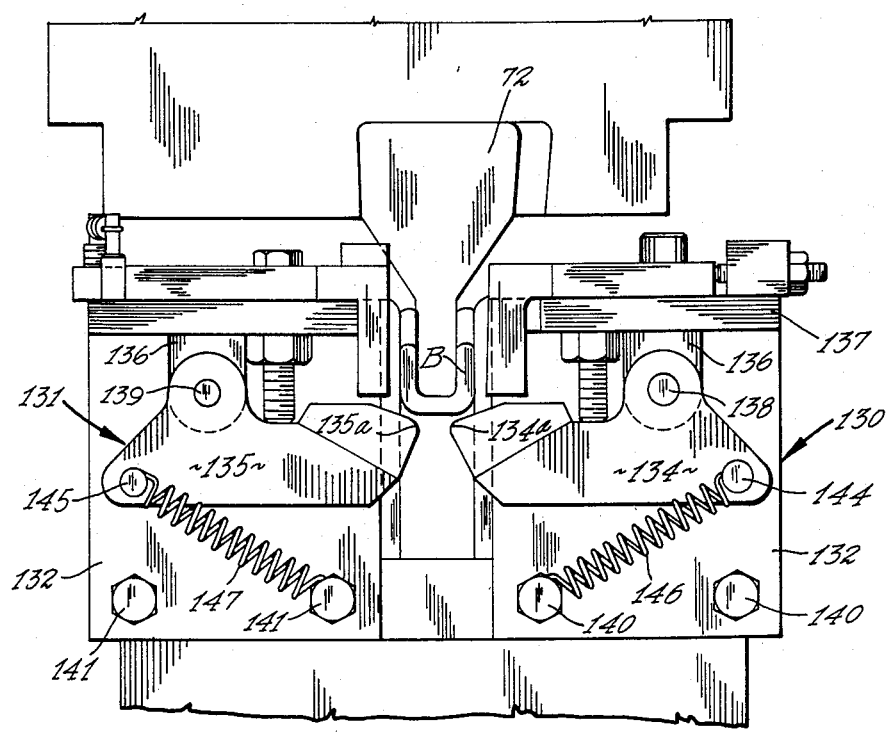
FIG. 4 is a side elevational view taken on line 4—4 of FIG. 2 showing mechanism for releasably supporting the rail anchor blank during the transfer thereof from the first forming station to the second forming horn.

FIGS. 3 and 4 illustrate the manner in which the rail anchor blank, formed in channel shape at the first forming station, is conveyed or transferred from the said first forming station to a second forming station. FIG. 3 further shows the second forming station structure. Referring now to FIG. 3, the means for transferring the blanks from the first forming station to the second forming station comprises linkage mechanism, similar to that shown in FIG. 1, for communicating reciprocating movement from the ram 6 to a push bar 103 to advance a blank formed at the first station. The mechanism comprises an angled ram arm 80 fixedly mounted on the reciprocating ram 6, the bottom portion of said ram arm 80 being integrally secured to a transversely extending arm portion 82 to form a generally L-shaped ram arm, the arm portion 82 having an opening 83 in the free end thereof, a clevis 85 being operatively connected to the said arm 82 by pin means 84 through said opening 83. An elongated actuating rod 86, similar to the rod 28, is rigidly secured at its upper end to the lower portion of the lower portion of the shear clevis 85 and is connected to actuating arm 97 through clevis 88, a short link 93, and shaft 95, whereby motion is transferred from rod 86 to actuating arm 97. Referring to the specific motion transferring means, the lowermost clevis 88 has associated therewith a pair of pins 90 and 91, the latter being mounted for lost motion. The link or arm 93 is pivotally mounted on the pin 91, and is integrally connected at its other end to the shaft 95, mounted on a pillow block, and said shaft 95 is in turn integrally secured to the arm 97, similarly to the connections 35, 36, and 42 in FIG. 1, whereby movement of the arm 93 will correspondingly move the arm 97.

The means whereby the movement of actuating arm 97 is translated to operate the transfer push bar 103 comprises a cam follower 98 mounted on the upper end of arm 97 and adapted to ride in a slot 99 in a cam follower yoke 100. The cam follower yoke 100 is connected to push bar 103 through a flange 101 which has apertures through which bolt means 102 extend upwardly into threaded engagement with threaded openings in the bottom surface of push bar 103. The transfer push bar 103 is preferably relatively narrow to enable said bar to reciprocate in the U-shaped opening defined by the die sides 64 and 65 and the die bottom 66, whereby the push bar 103 transfers the channel-shaped rail anchor blank B to the second form horn.

The bar 103 has securely mounted on the free end thereof a transfer push bar foot 104. The foot 104 preferably has a relatively thin layer of high temperature resistant alloy such as Stellite provided on the surfaces thereof which contact the high temperature channel-shaped blank, thereby significantly prolonging the life of the transfer push bar 103 and reducing costly maintenance on the press.

It will be seen that when the ram 6 is moved downwardly the ram arm 80, arm 82, and the actuating rod 86 will likewise be moved vertically downward, rotating the arm 97 counterclockwise, moving the cam follower yoke 100 and transfer push bar 103 to the left, as shown in FIG. 3 and when the ram 6 is in its most downward position, the transfer push bar foot 104 is withdrawn to a position with respect to the punch 73b, wherein the transfer push bar 103 is clear of interference with the first forming step. When the ram 6 is moved vertically upwardly, the transfer push bar 103 will correspondingly be moved in an opposite direction, or to the right, as shown in FIG. 3, by means of the above described linkage assembly, and the transfer push bar foot 104 is caused to engage the rail anchor blank formed at the first station, as shown in FIG. 2a, transferring the same to the second form horn.

During the transfer of the blank to the second form horn, the blank is supported by means of pivotable shelf assemblies 130 and 131, illustrated in FIGS. 2–4, mounted on the side of the die holder 62, said assemblies being provided with downwardly extending flanges 132 secured to the die holder 62 by suitable securing means such as, e.g. bolts 140 and 141. The pivotable shelf assemblies 130 and 131 provide a releasable support means for the transferring of the channel-shaped rail anchor blank of FIG. 2a, the support being releasable to facilitate the downward movement of the second form punch 111.

Referring now particularly to FIG. 4, the shelf assemblies 130 and 131 comprise a pair of spaced shelf members 134 and 135 which are supported for pivotable movement about shafts 138 and 139 respectively, said shafts being mounted in brackets 136, 136 depending from the horizontally extending plate members 137, 137 of the flanges 132. The shelf members 134 and 135 are resiliently biased in blank-supporting position, as shown in FIG. 4, by means of coil springs 146 and 147, respectively, connected to said shelf members at an outer corner thereof by bolt means 147 and 145, respectively, and to each flange 132 at an inwardly disposed edge thereof by pin means 146 and 147 respectively. The said shelf members 134, 135 are each provided on their confronting inner surfaces with a pair of integrally formed toe plates 134a and 135a respectively. It will thus be seen that the toe plates 134a and 135a of the shelf members 134 and 135, respectively, provide in combination a spaced, releasable support means for the channel-shaped rail anchor blank B during the movement thereof from the first forming station to the second forming horn 106.

Referring momentarily to FIG. 3, the channel-shaped rail anchor blank B is shown in a dotted line position immediately after the transfer thereof from the first forming station to a position overlying the second form horn, prior to the downward movement of the second form punch 111. In this position, the channel-shaped blank is shown as having a portion extending beyond the second form horn 106 and a portion disposed over the shelf mechanism. The blank B is held in this position by a pattern stop member 150 mounted on the press laterally thereof and to the right as viewed in FIG. 3, and the blank is thus supported by the top surface of the second form horn 106, and the toe plates 134a and 135a of the shelf members 134 and 135, respectively. As the second form punch 111 moves downwardly into engagement with the bottom or web of the channel portion of the channel-shaped blank B, disposed over the horn 106, the shelf members 134 and 135 pivot downwardly against the bias of the springs 146 and 147 and the channel-shaped blank supported thereby is released by the shelf members and is then supported solely by the second form horn 106, and caused by the downward movement of the punch 111 to assume the FIG. 3 solid line shape at the completion of the downward stroke of the said second form punch 111. As said punch 111 moves upwardly after completion of its forming cycle, the shelf members 134 and 135 assume their normal FIG. 4 position due to the action of the spring means 146 and 147, whereby the shelf assemblies are ready to support a subsequently transferred channel-shaped rail anchor blank.

Referring now in FIG. 3 to the second form punch assembly 111, the assembly comprises a form punch 112 substantially T-shaped in transverse cross-section and substantially U-shaped in longitudinal cross-section, the downwardly extending stem portion 112a thereof being provided with a centrally disposed arcuate notch 112b having positioned on either longitudinal side thereof a pair of punch cheek blocks 113 similarly formed in longitudinal cross-section. A pair of spacer elements 114 and 115 are interposed between the cheek blocks 113 and the stem portion of the form punch 112 to provide an anchor blank receiving space therebetween. Bolt means 118 holds the entire punch assembly together, comprising the pair of cheek blocks 113, the form punch 112, and the spacer elements 114 and 115. The upper portion of the generally T-shaped forming punch 112 is secured to the second form punch holder 110 by suitable securing means such as bolts 120.

The form punch 112 is provided with a bore 122 and a counter bore 123 through the longitudinal and transverse center thereof. Positioned in said bore and counter bore is a T-shaped resiliently mounted stripper means 125. The stripper means 125 has an upper surface 126 adapted to seat coil spring means 127, disposed within a bore 129 in the punch holder 110, said means seating further on a wear plate 128 disposed within the bore. The spring means 127 normally holds the stripper means 125 in its extended, downward position, as shown in FIG. 3. When, however, the second form punch assembly 111 moves downwardly during the forming cycle, the stem 125a of the stripper 125 will contact the bottom of the channel of the rail anchor blank. Upon continued downward movement of the second form punch assembly 111, the stripper 125 will be forced upwardly, against the bias of the spring 127, compressing the latter.

After the completion of the forming step, wherein the channel-shaped rail anchor assumes its FIG. 3, solid line configuration, the second form punch assembly 111 will move upwardly with the vertical upward movement of the ram 6. As the second form punch assembly 111 moves upwardly, eliminating the pressure on the stem 125a of stripper 125, the spring means 127 will resiliently urge stripper 125 downwardly, thereby stripping the substantially J-shaped rail anchor blank from the second form punch 112.

During the downward movement of the second form punch assembly 111, only the spacing elements 114 and 115 engage the channel-shaped rail anchor blank, the spacer elements being of such width as to be receivable within the channel of the blank, the bottom surfaces of the spacer elements 114 and 115 being provided preferably with a thin layer of Stellite so as to increase the resistance thereof to the relatively high temperatures of the rail anchor blank. During the downward movement of the second form punch assembly, the upwardly extending wall portions of the channel-shaped rail anchor, which are positioned upon form horn 106, extend into the space provided by the spacer elements 114 and 115 between the cheek blocks 113, 113 and the second form punch 112. It will be apparent that the second form horn 106 and that portion of the blank positioned immediately thereover will extend into the arcuate notches 112b formed in the punch 112 and cheek plates 113, 113 and said notches act as a guide therefor.

The second form horn 106 is vertically mounted on a base 107 mounted on bolster plate 3. It includes a rounded top portion 108a around which the rail anchor blank B is bent during the downward movement of the second form punch assembly and a main body portion 108b.

FIG. 3a is an enlarged perspective view of the rail anchor blank of substantially J-shape formed by the second form horn and punch assembly.

Subsequent to the forming of the rail anchor blank at the second forming station, the same is transferred to the third or final forming station. The transfer mechanism for accomplishing such transfer is shown in FIG. 5 and, in general, includes structure to translate vertical movement of reciprocating ram 6 into transverse reciprocating motion of a transfer push bar. Specifically, the transfer mechanism comprises a pivot mount 160 fixedly secured to the bottom of the reciprocating ram 6 by means such as, e.g., bolts 160a. Pivot mount 160 has a pair of parallel, downwardly depending brackets 161, said parallel brackets being spaced to receive therebetween an upwardly extending tongue portion 162 of an elongated link member 164. Flanges 161 and tongue portion 162 are provided with aligned apertures for the reception of a pin 162a extending therethrough whereby the link 164 is adapted to be secured to and reciprocated by the reciprocating ram 6.

The link 164 preferably comprises a thin flat bar which extends downwardly from the brackets 161 and terminates in an apertured tongue portion 165, which portion extends between a pair of spaced arms 166 which are pivotably mounted around shaft 168.

The spaced arms 166 are secured to a shaft 170 as, e.g., by welding, whereby downward movement of arms 166 will cause shaft 170 to be rotated counterclockwise. Shaft 170 has further secured thereto a pair of spaced arms 172 which are secured to pin means 174, said pin means also serving as mounting means for a link member 180 disposed between the arms 172. The shaft 170 is suitably journalled in any suitable journal means, such as, e.g., pillow block 171.

It will thus be seen that when reciprocating ram 6 is moved vertically downward, arm 164 will move downward whereby arm 180 is caused to move transversely, or to the left, as shown in FIG. 5.

Referring now to the manner in which movement is translated from arm 180 to push mechanism adapted to transfer blanks from the second form horn to the third or final form horn, the arm 180 is connected to a link bracket 184 by means of a pin 182, the link bracket 184 and the arm 180 being provided with aligned openings for the reception of said pin 182. The link bracket 184 is preferably connected to an elongated crank arm 188 by suitable means such as, e.g., bolts 185. The elongated arm 188 has a shaft-receiving bearing portion 190 at the lower end thereof in order to receive shaft 186. Reinforcing ribs 189 extend downwardly from the flat side portions of arm 188 into engagement with the bearing portion 190 and are held thereto by means such as, e.g., welding. Shaft 186 is mounted in a pair of pillow blocks 187, the pillow blocks being mounted for slidable movement, as will be more specifically pointed out hereinbelow. It will thus be seen that as arm 180 moves to the left, arm 188 will pivot counterclockwise about shaft 186, or to the left, as shown in FIG. 5.

The movement of arm 188 is transferred to a push bar 198 by means of a cam follower 192 which projects outwardly from the arm 188, the cam follower 192 riding in slot 193 formed in the cam follower yoke 194. The cam follower yoke 194 is fixedly secured to the push bar 198 by means of bolts 195 which extend through openings in the upper portion of the cam follower yoke 194 and to threaded engagement with threaded openings in the push bar 198.

The push bar 198 is provided at its front end portion with a push bar fork foot 206 connected to the push bar 198 by means of bolts 207. The fork foot 206 functions to provide additional bearing surface for contact with the rail anchor blank during the transfer thereof from the second form horn to the final or third form horn. The front surfaces of push bar fork foot 206 and the end of push bar 198 are preferably provided with Stellite, for the purpose described above.

Referring now to FIG. 5 and FIG. 5a, the pusher bar 198 is guided in its reciprocating movement by means of a mounting assembly comprising a pair of bearing mount hangers 200. As can be seen in FIG. 5, the bearing mount hangers 200 are connected at the lower portions thereof by means of a connecting web 201, said web being connected to the frame of the press by means of bolts 202, whereby said bearing mount hangers are fixedly held in place.

Secured near the top portion of the bearing mount hangers 200 is a bearing mount hanger plate 350. Bearing mount hanger plate 350 is adapted to engage shoulder portions 354 of the bearing mount hangers 200 and is adapted to be secured to the bearing mount hangers by means of bolts 352, whereby said bearing mount hanger plate is maintained in a fixed perpendicular relationship relative to the bearing mount hangers 200.

The bearing mount hanger plate 350 is provided with a plurality of openings 364 and 382 in order to accommodate cam means 366 and 380 adapted to guide the push plate 198 in its movement. Mounted on the top of the bearing mount hanger plate 350 and extending upwardly therefrom is a cam follower mounting bracket 360, which is secured to the hanger plate 350 by means of bolts 362, preferably two in number. The mounting bracket 360 has a downwardly extending leg portion 363 which extends downwardly into the opening 364 in the hanger plate 350. The leg portion 363 is provided with a circular opening 365 which is adapted to frictionally receive an externally threaded cylindrical pin portion 367 of the cam follower 366, a threaded nut 368 being disposed therein for the purpose of securing the cam follower 366 to the leg 363. A grease fitting 370 is preferably mounted in the top face of the mounting bracket 360 and the leg portion 363 is provided with a relatively small annular opening surrounding the cylindrical pin 367 in order to lubricate the pin portion 367. Although it will be apparent that an exact number of cam follower members 366 is not required, preferably three are employed, two of which are in the same longitudinal plane, and the third is in a longitudinal plane parallel to and offset from the plane of the other two cam followers. Due to this offsetting the cam follower members 366, said cam followers serve to provide a bearing surface for both sides of the top surface of the pusher bar 198.

A plurality of cam follower members 380 are also mounted on said hanger plate 350 adapted to contact the sides of the pusher bar 198. As shown in FIG. 5a, the cam follower 380 has a cylindrical pin portion 381 which extends upwardly through an aperture 382 in the hanger plate 350. The cam follower 380 is held in place by means of a nut 386 which is in threaded engagement with the outer threaded portion of cylindrical pin means 381. A grease fitting 388 is provided to maintain the cylindrical pin 381 of said cam follower 380 in a lubricated condition during rotation thereof. Although in FIG. 5a, I have shown only one cam follower member 380 for purposes of clarity, there are preferably employed six such cam followers, three of which extend in the same longitudinal plane as the illustrated cam follower 380, and the remaining three of which are mounted on the other side of the pusher plate 198 so as to engage the other side of said pusher plate.

A third set of cam follower members 400 are employed to bear against the bottom of the pusher bar 198 and guide the same during the reciprocating movement thereof. Referring to FIG. 5a, a mounting block 392 is secured to and extends downwardly from the hanger plate 350 by means of bolts 396, preferably two in number. The bottom portion of mounting block 392 is provided with an opening 398 which is adapted to frictionally receive a cylindrical pin portion 399 of cam follower means 400. The end portion of cylindrical pin 399 is threaded and adapted to receive a threaded nut 402, in order to maintain said cam follower 400 in the desired mounted position. As in the other cam follower members, cam follower 400 is provided with a grease fitting 404 which is adapted to maintain cylindrical pin means 399 in a lubricated condition. There are preferably employed in the form of the invention shown herein eight cam follower elements 400 and these are separately positioned against the bottom of the pusher bar 198 at both sides thereof.

The cam follower 192, referred to above, is mounted on the arm 188 in a manner similar to the cam follower referred to above. Noting FIG. 5a, the cam follower 192 is mounted on arm 188 by pin means 193, said cam follower 192 being adapted to be maintained in position by means of threaded screw 192a. Similar to the above described cam follower members, cam follower 192 is provided with a grease fitting 192b for lubricating purposes.

It will thus be seen that when reciprocating ram 6 moves vertically downwardly, link arm 164 will function to move arm 188 by means of the above described linkage assembly, whereby cam follower 192 moves the cam follower yoke 194 rearwardly as viewed in dotted lines in FIG. 5. The pusher bar 198 is guided during movement by cam follower members 366, 380 and 400, mounted on the top, sides and bottom of the pusher bar 198, thus providing relatively frictionless guidance of said pusher bar.

Positioned between the second form horn 106 and the final form horn 210 is a transfer horn 208 which carries at opposite ends thereof the second form horn and the final form horn respectively. The contour of the transfer horn 208 is similar to that of the second form horn. Preferably, however, the transfer horn is of slightly less cross-sectional area than the preceding and succeeding form horns carried thereby to assist in easy transfer of anchors from and to the said form horns and to resist any tendency of the anchor blanks to bind while transferring the same thereover.

Figure 6:
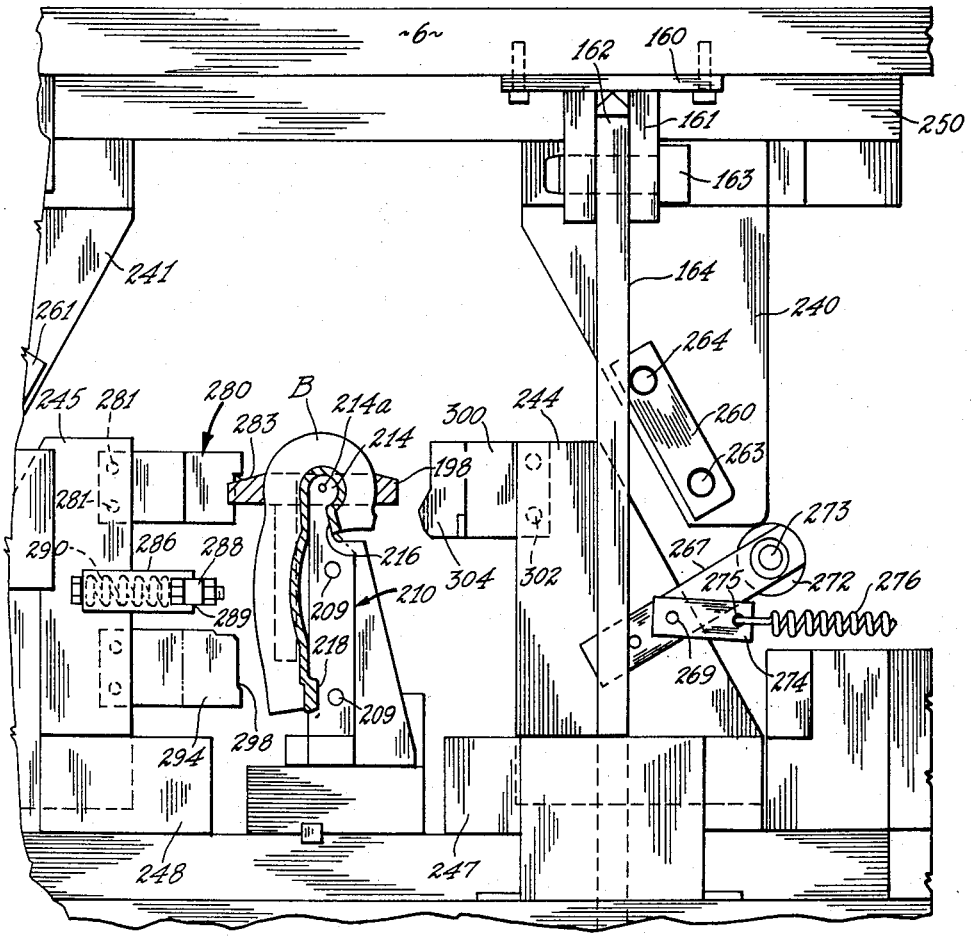
FIG. 6 is a front elevational view of the invention of the preceding figures, partly in section, showing more specifically the final forming horn and punch structure.

The push bar fork 198, noting momentarily FIG. 6, is of such a width that the upper or loop portions of the now generally J-shaped rail anchor blank can be engaged and transferred thereby to the final form horn 210. It will be noted that the push bar fork 198 reciprocates in the same plane as the uppermost portion of the second form horn 106 and the transfer horn 208 and therefore the push bar fork 198 is provided with a slot 198a, FIG. 5a, longitudinally disposed therein of sufficient length so that the top portion of the second form horn 106 and the transfer horn 208 may extend into said slot during the entire forward motion of the push bar fork 198.

Subsequent to the transferral of the blank to a position on the final form horn 210 at the third forming station, means are provided for maintaining said blank on said horn during the forming operation at said third station. The means for maintaining the blank on the final form comprises, referring to FIG. 5, an upper stop bearing mount 212 which is securely mounted to the transfer horn 208 by means, such as, e.g. bolt means 213. The upper stop bearing mount 212 is secured to one side of the transfer horn so as to not interfere with the transverse reciprocation of push bar fork 198.

Fixedly mounted on the upper portion of the upper stop bearing mount 212 is an upper stop bearing member 214 which is secured to the bearing mount 212 by bolt means (not shown). Extending upwardly from the top of the upper stop bearing 214 are a pair of ears 216, said ears having openings therein in the upper portion thereof for the reception of pin means 217. An upper rail anchor stop member 215 is pivotally mounted in the upper stop bearing 214 by pin means 218 which extend through aligned openings in the sides of the bearing member 214. A leaf spring 219 has one end thereof coiled around the pin means 217 and the other end thereof engaged with the upper surface of upper stop member 215, whereby the stop member 215 is biased downwardly into the position shown in FIG. 5. In this position the rail anchor blank B is firmly held on the final form horn 210 by engagement of detent portion 220 of upper stop member 215 with the bottom of the channel of that portion of the rail anchor blank B disposed over the curved portion of the final horn member.

The said upper stop member 215 has a downwardly projecting central portion 222, which engages the next succeeding rail anchor blank in a manner to be described more specifically below.

Describing now the operation of the stop member 215, the downward movement of the reciprocating ram 6 functions through the above described linkage assembly to withdraw the push bar fork 198 to the left, looking in the FIG. 5 direction. The push bar fork 198 will be withdrawn to a position whereat the front end thereof will be positioned to the left of the second form horn 106. When the push bar fork 198 is in this withdrawn position, the second form horn 106 can freely receive a succeeding rail anchor blank thereover, said succeeding blank being deformed over said second form horn by the second form punch 111. As the reciprocating ram, upon the completion of the downward movement thereof, moves upwardly, the push bar fork 198 will move to the right, as viewed in FIG. 5, engaging the rail anchor blank positioned over the second form horn. As the front surface 205 of the push bar 198 and the front surface of the push bar fork 206 engage the rail anchor blank and transfer it to the right, the front surface of said blank will engage said downwardly projecting central portion 222 of said upper stop member 215, and will pivot the same upwardly about pivot pin 218. As the upper stop member 215 pivots upwardly, detent 220 will ascend to a point above the uppermost flange of the rail anchor blank B, positioned freely over the final form horn 210. Upon the continued forward motion of push bar fork 198, the next succeeding rail anchor blank contacts the rail anchor blank freely suspended on the final form horn 210 and forces the same therefrom; the removed rail anchor, in completed form, falling by gravity into a discharge chute 320 in a manner to be more fully explained hereinbelow.

As the succeeding rail anchor is moved to the right by the push bar fork 198, the rear flange of the blank clears the downwardly projecting central portion 222 of the stop 215 whereby the leaf spring 219 functions to bias the upper stop 215 downwardly whereby detent portion 220 engages the web of the channel of the succeeding rail anchor blank B and holds the same firmly over the final form horn during the final forming operation. It will thus be seen that in normal, continuous operation of the press, there is no independent transfer mechanism for removal of the completed rail anchor blank from the final form, the removal thereof being completed by engagement thereof with the next succeeding rail anchor blank. However, in accordance with the instant invention the transfer mechanism for transferring blanks to the final horn 210 is constructed so as to enable said transfer mechanism to positively discharge the completed rail anchor from the final form horn, e.g. after a temporary stopping of the press or in the event an anchor is not followed by a succeeding anchor.

Referring now to the manner in which the transfer mechanism may be selectively actuated as by manually or automatically controlled switch means to eject the final rail anchor blank from the final form horn.

As set forth above, the pillow blocks 187 are slidably mounted, whereby said pillow blocks may be reciprocably moved forwardy or rearwardly, or to the right and left as viewed in FIG. 5. The pivot shaft 186, about which arm 188 pivots, being mounted in said pillow blocks, said shaft can be moved forwardly, or to the right as viewed in FIG. 5, thus relocating the pivot for the arm 188 and providing an additional amount of travel for the arm 188 to enable the pusher bar 198 to reciprocate forwardly to a point sufficient with respect to the final form horn to eject the completed rail anchor from said final form horn.

Referring now to FIGS. 5 and 5b, pillow blocks 187, preferably two in number, are mounted on an adjustable base member 430 by means of bolts 187a. The slidable and adjustable base member 430 is adapted to be guided during movement thereof by a stationary L-shaped base member 420, the latter having a vertically extending leg portion 422 and a horizontally extending leg portion 424. Leg portion 422 is provided with a plurality of openings to receive bolt means 426 which extend through said openings into engagement with the frame of the press, thereby securing the stationary base member 420 to said frame. Reinforcing gussets members 428, preferably two in number, extend between the vertically extending leg portion 422 and a horizontally extending leg portion 424 and serve to further reinforce the stationary base member 420. A pair of L-shaped guide members 460 and 460', noting FIG. 5b, are mounted on either side of the stationary base meber 420 and function to guide the slidably mounted base member 430 during movement thereof. The L-shaped guide members 460 and 460' comprise horizontally extending leg portions 461 and 461', respectively, which extend inwardly over the top surface of the adjustable base member 430, and vertical leg members 462 and 462', respectively. A plurality of openings are provided in the guide members 460 and 460' for the reception of bolt means 468 which extend downwardly into the stationary base member 420 and securely position the guide members thereto.

Mounted forwardly of the adjustable base member 430 and serving to limit the travel thereof are a pair of fixed and a pair of adjustable abutment members. The fixed abutment members 440 are rectangular in shape and are preferably welded to the upper surface of the stationary base member 420. Mounted adjacent the fixed abutment members 440 are a pair of adjustable members 450. Each of said adjustable members 450 is provided with a rectangular slot 452 which is adapted to adjustably receive bolt means 453, said bolt means extending downwardly into a threaded opening in the stationary base member 420. It is to be noted that shim means (not illustrated) of different sizes may be placed in the joint between the movable abutment means 45 and the fixed stop means 440 whereby the extent of travel of the adjustment lever 188 may be varied. It will be apparent that the adjustable abutment means 450 can be moved forwardly or rearwardly relative to the stationary abutments 440, as limited by such shim means and said bolt means to limit the movement of the slidably mounted base member 430.

On the opposite side and mounted rearwardly of the slidable base member 430 is a pair of fixed abutment members 444, both of which are secured to the top surface of the stationary base member 420 by means of welding. The abutment members 444 serve to limit the movement of the slidable base member 430 when the lever 188 is in its extended travel position as shown in solid lines in FIG. 5 and the abutment members 440 limit the movement of the slidable base member 430 when the lever 188 is in its normal travel position as shown in dotted lines.

An upwardly extending support member 436 is secured to the slidably mounted base member 430, centrally and rearwardly thereof, preferably by means of welding, and said member is provided through the center thereof with a circular threaded opening 438.

A double-acting piston rod 474 is threadedly received in the opening 438, said arm 474 extending outwardly from and forming a part of an automatic, push button operated air cylinder 470, mounted upon the stationary base member 420 by means of bolts 472 and of a well known type. The said cylinder 470 is preferably solenoid operated and actuated by means of either a manually controlled push button positioned in a convenient location on the press frame, as shown, or automatically operated by switch means, (not shown). In my novel transfer mechanism, energization of the cylinder 470 actuates the double-acting arm 474 causing the same to withdraw into the cylinder or to move to the left, as viewed in FIG. 5b, moving the adjustable base member 430, on which it is mounted, rearwardly, due to the fixed relationship between the arm 474, member 436 and adjustable base 430. The said rearward movement of the base 430 causes rearward movement of the pillow blocks 187 and the shaft 186. As the shaft 186 therefor moves rearwardly, the upper end of the pivot arm 188 mounted thereon moves to the right, moving the cam 192 to the right and hence causing movement of the yoke 194 to the right wherefor the pusher fork 198 exerts force against a final form rail anchor to eject the same from the final horn.

The rearward motion of the adjustable base member 430 is stopped when the same strikes the forward face of the adjustable abutment means 444. In FIG. 5 the adjustable base 430 is shown in solid lines in its rearmost position, whereat the rear surface of the adjustable base member 430 abuts the forward surface of the adjustable abutment member 444.

As set forth above, the above described rearward relocation of the shaft 186 provides the arm 188 and hence the pusher bar 198 with a sufficient increase in forward travel to enable the push bar fork 198 to positively eject a final or single rail anchor blank from the third or final form horn.

Upon deenergization of the actuating means for the cylinder 470, the double-acting piston arm 474 will be projected in a well known manner, thus slidably moving the adjustable base member 430 forwardly, the forward movement thereof being limited by the fixed abutment members 450 mounted on either side of the base 424. In this forward position, the pillow blocks 187 and shaft 186 will assume normal operational position wherein the travel of the pusher bar fork 198 extends forwardly only to the rear side of the third or final form horn, whereby the ejection of the completed rail anchor from the third or final form horn is accomplished by propulsion thereof by the next succeeding rail anchor being delivered to said third or final form horn.

During the engagement of detent 220 with the web of the channel of the succeeding rail anchor blank, whereby said rail anchor is held firmly in position on the final form horn, certain final forming operations are performed on the anchor by actuation of a third form punch assembly. The third form punch assembly, referring to FIGS. 6, 7 and 8, comprises tapered actuating blocks 240 and 241 fixedly secured to the reciprocating arm 6 through a final form top die shoe 250, whereby actuating blocks 240 and 241 are adapted to reciprocate with reciprocating ram 6. The actuating blocks 240 and 241 are provided with punch opening cams 260 and 261, the punch opening cams being secured to the actuating blocks 240, 241 by bolt means, as shown at 263 and 264.

Positioned directly below the actuating blocks 240 and 241 are final form punch holders 244 and 245, the punch holders 244 and 245 being slidably mounted in punch holder slide members 247 and 248 mounted on the press frame.

Figure 7:
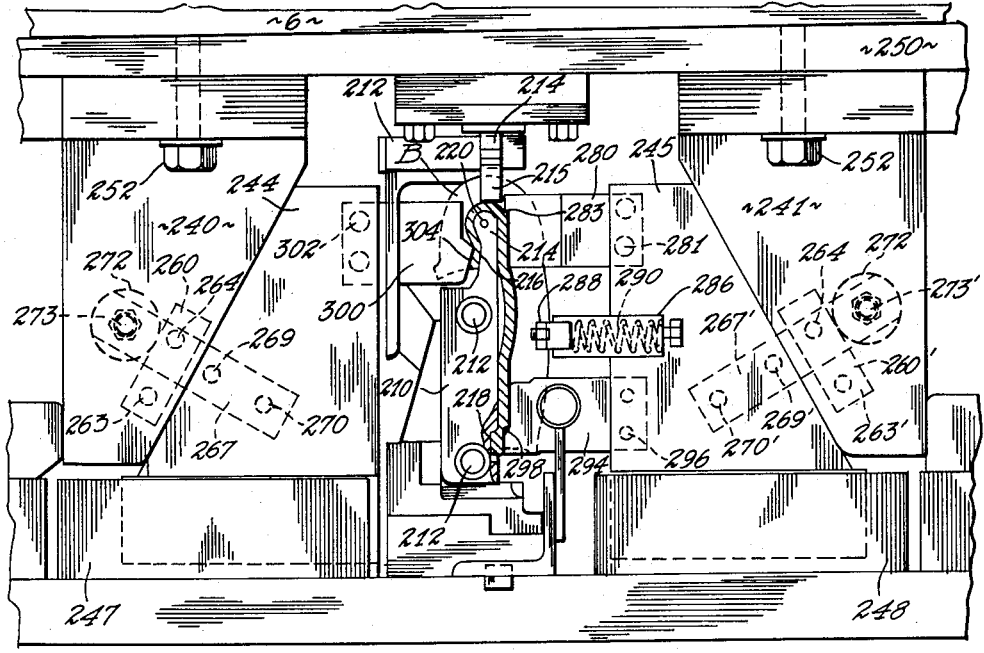
FIG. 7 is a rear elevational view showing the final horn and punch structure and mechanism for actuating the same.

Each of the sliding punch holders 244 and 245 have securely fastened thereto cam follower mounts 267 and 267', respectively, the latter being shown in FIG. 7. The cam follower mount 267, referring to FIG. 6, is secured to the sliding punch holder 244 by bolt means 270 and 269 and has mounted on the outer end thereof a cylindrical cam follower 272 which is rotatably mounted on said cam follower mount by pin means 273. Securely mounted on the lower portion of the cam follower mount 267 is a rectangularly shaped spring mounting bar 274. The bar 274 is provided in the outer end thereof with an opening 275 which receives spring means 276, said spring means 276 functioning in a manner to be hereinafter described.

It will thus be seen that as reciprocating ram member 6 moves downwardly the inclined surface of the actuating blocks 240 and 241 will engage the inclined surfaces of the sliding punch holder elements 244 and 245 moving the same forwardly in the punch holder slides 247 and 248. It should be noted that the punch opening cam 260 and cam follower mount 267 and cylindrical cam 272 are mounted on the ends of the actuating block 240 and sliding punch holder 244, respectively, so as to not interfere with the downward movement of actuating block 240. The cylindrical cam 272 is mounted in the same vertical plane as the punch opening cam 260.

As the inclined surface of the actuating block 240 contacts the inclined surface of the sliding punch holder 244 and slides the latter toward the final form horn, the punch opening cam 260 will correspondingly move down the inclined surface of sliding punch holder 244 and will eventually assume the position illustrated in FIG. 7.

As illustrated in FIG. 7, the actuating block 241 and punch holder 245 are provided with camming structure identical to that provided for the actuating block 240 and the punch holder 244 whereby specific referral thereto is deemed unnecessary.

The final form punch assembly includes a plurality of individual punch members which combine with the final form horn to provide the specific desired features of the completed rail anchor. The individual punch members include an overdrive punch 280 which upsets a portion of the curved loop to form a stop or protuberance on the completed anchor to prevent overdrive of said anchor onto the rail flange, a hook punch 294 which forms on the rail anchor a hooked end portion for hooking the anchor onto the rail flange, and a sizing punch 300 which functions to provide the C-shaped end of the rail anchor with the desired shape.

Referring now to the specific structure of the forming punches of the final form punch assembly, the overdrive punch 280 is secured to sliding punch holder 245 by means such as, e.g. bolts 281. The final form overdrive punch 280 is provided with a shoulder 283 which, when engaging the inside surface of the channel of the rail anchor blank, forms a projection thereon, as clearly shown in FIG. 7a. This projection functions in a manner more fully set forth in the above described application S.N. 823,637 and, generally, functions to prevent overdriving of the rail anchor during application thereof onto the rail flange.

Mounted on the lower portion of the sliding punch holder 245 is the final form hook punch 294, the hook punch being secured to the sliding punch holder 245 by bolt means 296. The final form hook punch 294 is provided with a projecting shoulder 298, which shoulder combines with the final form horn to provide a rail flange-engaging hook portion on the completed rail anchor.

The final form sizing punch 300 is secured to the sliding punch holder 244 by means of bolts 302. The sizing punch 300 is provided with a tapered shoulder portion 304 which, when the sliding punch holder 244 is moved forward in the above described manner, engages the bottom of the channel of the rail anchor blank and forces the same against the final form horn to provide the desired final shape of the C-shaped end portion of the rail anchor.

A final form stripper means 286 is seated in an opening in the sliding punch holder 245, said stripper 286 being provided with a spring-mounted pin element 288 which is adapted to reciprocate in an opening 289 in the stripper 286. The pin element 288 is normally held in the outwardly extending FIG. 6 position by means of a spring 290. However, when the anchor stripper 286 moves inwardly with the movement of the sliding punch holder 245, the outer end of the pin element 288 will engage the bottom of the channel of the rail anchor blank, whereby the pin element 288 will be forced inwardly relative to the casing of stripper 286, thereby compressing spring 290 seated therein. It will be apparent that when sliding punch holders 244 and 245 are moved away from the final form horn, in a manner to be described hereinbelow, the rail anchor blank B is stripped from the final form punches, whereby the rail anchor blank B is held freely suspended on the final form horn and maintains the shape formed thereat.

Referring now to the withdrawal of the final form punches from the final form horn, upon the completion of the forming cycle, said withdrawal is actuated by the upward movement of reciprocating ram 6, similar to the manner in which the forming punches at the first and second forming station are withdrawn from the forming dies. Referring to FIG. 7 it will be seen that when ram 6 moves upwardly, actuating blocks 240 and 241 move vertically upwardly, the adjacent surface of punch opening cam 260 will engage the surface of the cam cylinder 272, whereby continued upward movement of the actuating punch will cause the sliding punch holder 244 to be moved rearwardly.

It will be obvious that the sliding punch holder 245 mounted opposite from punch holder 244 will be withdrawn in a similar manner, and specific reference thereto is deemed unnecessary. Each of the elements of the cam follower mount 267' and the punch opening cam associated with the actuating punch 241 and sliding punch holder 245 are identical with their counterparts above described, and have been designated by the same reference character with an attached prime.

Figure 8:
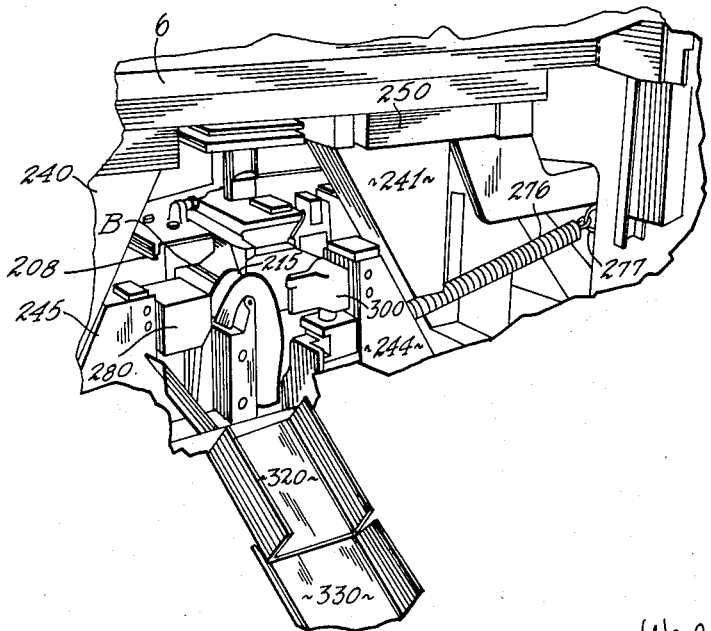
FIG. 8 is a rear elevational view of the machine, showing the final forming horn and punch structure means by which the competed rail anchor is dispensed from the final forming horn and the apparatus.

Referring now to FIGS. 6 and 8, the movement of the sliding punch holders 244 and 245 away from the final form horn is supplemented by the spring means 276, which is secured at one end to the bars 274, and functions through said bar member 274 to exert a spring pressure on the cam follower mount 267. The other end of the spring means 276 is mounted on a hook 277 fixedly mounted on the die press frame. Although only one spring is shown in FIG. 6, it will be obvious that an identical spring arrangement is provided on the opposite side, associated with sliding punch holder 245, to withdraw the same.

Referring now to FIG. 7, the final form assembly is shown in a position wherein the final form punches are shown approaching each other, forcing the rail anchor blank B interposed therebetween and suspended on the horn 210 around the said final form horn 210 ironing the same in final form. The final form overdrive punch 280 at such time is in engagement with the bottom of the channel of said rail anchor blank, the shoulder 283 of said overdrive punch forming a projection on said rail anchor blank for purposes described above. Similarly, the final form hook punch 294, when in a forward anchor-engaging position, engages the bottom of the channel of said rail anchor, the shoulder 298 of said hook punch 294 serving to form a hook end portion on said rail anchor blank B. The sizing punch 300, when in its forwardmost position, functions to force the relatively short, C-shaped loop end of the rail anchor blank around the final form horn into the desired final shape. In the FIG. 7 illustration, wherein the punches are in their final forming position, the detent 215 of the upper stop member 214 is shown as engaging the bottom of the channel of the rail anchor blank holding the same in place during the forming cycle. The final form horn 210 comprises a rounded, top portion 214, an inclined loop forming upper portion 216, and an inwardly offset lowermost portion 218 for the reception of the shoulder 298 of the punch 294. The final form horn 210, which is carried by the transfer horn or rail means 208, is secured to the same by means of bolts 209 which extend through aligned openings in both the horn 208 and the final form horn 210. The top, rounded portion 214 of the final form horn 210 is preferably provided with an opening 214a through which a source of pressurized air (not shown) can flow for the purpose of cooling the top portion 214 of the horn 210 which may have a tendency to heat due to the ironing thereon.

Referring now to FIG. 7a, there is therein shown a completed rail anchor. The completed rail anchor includes a downwardly bowed central portion B1, a hook-like end portion B2, an overdrive projection B3, and bearing pad portions B4 and B5. For a further detailed description and the method of application of the illustrated rail anchor, attention is drawn to the above mentioned U.S. application S.N. 823,637.

Referring now to FIG. 8, a view taken from the rear of the machine, the rail anchor blank B is shown positioned over the final form horn 210, immediately prior to the final forming thereof by the final form punch members. As noted above, there is preferably no independent transfer or discharge mechanism for removing the completed rail anchor blank from the final form horn. As above described, the completed rail anchor blank in normal operation is dislodged and ejected from the final form horn by means of contact therewith by the next succeeding rail anchor being transferred to the final form horn. After the completed rail anchor is ejected from the final form horn it falls by gravity down chute 320 into chute 330 for subsequent handling.

The operation of the apparatus should be apparent from the above description but for purposes of clarity will be briefly re-described. The heated flat rail anchor blanks are fed from an appropriate heating source, e.g. a furnace, to the magazines 10, 10' by means of the inclined chute 14. The rail anchor blanks are then transferred, one at a time, preferably to a stamping station and then to the first forming station, whereat the forming die assembly forms the flat rail anchor blank into a generally channel-shaped blank having an irregular bottom surface. Subsequent to the forming of the rail anchor blank at the first forming station, said channel-shaped rail anchor blank is transferred to the second forming station, which comprises a second form horn and punch, whereat the rail anchor blank is formed into a substantially J-shaped, channeled anchor. The J-shaped rail anchor blank is then transferred to a final form horn whereat the final structural features are formed therein by a plurality of punches at the final forming station. The completed rail anchor is then ejected from the final form horn by contact with the next succeeding rail anchor blank during normal operation or by means of the adjustment lever of the third transfer mechanism anchor blanks are ejected from the final form horn, as by actuation of cylinder 470, etc., as set forth above. The finally formed rail anchor is discharged from the machine by means of a chute located in the rear thereof.

The actuation of the punch elements at each forming station and the actuation of the transfer mechanism are responsive to the movement of the reciprocating ram 6. The downward movement of ram 6 simultaneously actuates mechanism to perform the following: the final form horn punches close around the final form horn thus performing the final shaping of the completed rail anchor; the second forming punch simultaneously moves downwardly around the second form horn and transforms the next succeeding rail anchor blank into a generally J-shape; the first form punch simultaneously moves downwardly and forms a generally channel shape in the second succeeding blank; a stamping operation, if desired, is simultaneously performed on a third succeeding rail anchor blank; the transfer mechanisms above described, i.e., the transfer mechanism for transferring a rail anchor blank from the magazine to the first forming station, the transfer device for transferring the rail anchor blank from the first station to the second station, and the transfer mechanism for transferring the rail anchor blank from the second station to the third station, are simultaneously actuated to a withdrawn position during the downward movement of reciprocating ram 6.

Upon the upward movement of reciprocating ram 6, the forming punches simultaneously move away from the forming dies and the transfer mechanisms are simultaneously moved to a blank-engaging position whereby the blanks are transferred to the next station to complete the cycle.

What I claim as my invention is:

1. Apparatus for automatically forming one piece rail anchors from metal blanks comprising, in combination, transfer means to transfer said blanks, one at a time, to a first forming station, a second transfer means to transfer said blank from said first forming station to a second forming station, a third transfer means for transferring said blank to a third forming station, said third transfer means being pivotably mounted about a movable pivot means, means for moving said pivot means, whereby movement of said pivot means causes a change in the path of travel of said third transfer means.

2. Apparatus for automatically forming one piece rail anchors from metal blanks comprising, in combination, means to receive and temporarily hold said metal blanks, transfer means to transfer said blanks, one at a time, from said first means to a first forming station, said first forming station including a stationary member and a reciprocating member cooperable therewith for forming said blank into a predetermined shape, a second transfer means to transfer said blank from said first forming station to a second forming station, said second forming station including a stationary forming member and a reciprocating member cooperable therewith for further forming said rail anchor blank, a third transfer means for transferring said blank to a third forming station, said third forming station including a stationary member and a reciprocating member cooperable therewith for forming said blank into its final form, said third transfer means being pivotably mounted about a movable pivot, means for moving said pivot means, whereby movement of said pivot means causes a change in the path of travel of said third transfer means.

3. The combination of claim 1 wherein said means for moving said pivot means comprises a solenoid actuated air cylinder.

4. The combination of claim 3 wherein said rail anchor contacting member is guided during movement by a plurality of cam follower means which contact the top, bottom and sides of said member thereby reducing the friction created thereby during movement thereof.

5. The combination of claim 1 wherein said third transfer means comprises a rail anchor contacting member, a crank arm operatively connected to said member, said crank arm being mounted at its lower end to said movable pivot means, said pivot means being movable in a direction generally parallel to the direction of movement of said rail anchor contacting member, whereby movement of said pivot means changes the path of travel of said rail anchor contacting member.

6. The combination of claim 1 wherein said third transfer means comprises a push bar adapted to contact a rail anchor blank, a cam follower yoke secured to said push bar, a crank arm, one end of said crank arm having associated therewith a cam follower means adapted to coact with said cam follower yoke, the opposite end of said crank arm being pivotably mounted about a movable pivot means, said pivot means being movable in a direction generally parallel to the direction of movement of said push bar, whereby movement of said pivot means changes the path of travel of said push bar.

7. Apparatus for automatically forming one piece rail anchors from metal blanks, comprising, in combination, a plurality of forming stations, a plurality of transfer mechanisms to transfer said blanks to said forming stations, one of said transfer mechanisms being pivotably mounted about a movable pivot means, means for moving said pivot means, whereby movement of said pivot means causes a change in the path of travel of said one of said transfer mechanisms.

No references cited.